Aug. 21, 1928.  1,681,874

A. F. OUELLET

OPTICAL DEVICE

Filed Dec. 15, 1926

INVENTOR
Albert F. Ouellet

WITNESSES

BY
ATTORNEY

Patented Aug. 21, 1928.

1,681,874

UNITED STATES PATENT OFFICE.

ALBERT F. OUELLET, OF JERSEY CITY, NEW JERSEY.

OPTICAL DEVICE.

Application filed December 15, 1926. Serial No. 155,004.

This invention relates to optical devices and has particular reference to an improved means for facilitating the removal from the eye by the user, of cinders or other foreign objects.

The invention primarily comprehends a device of the character set forth which includes a mirror having means permitting of the positioning of the same relative to the eye by a portion of one hand while using the thumb and forefinger of the same hand to open the eye, whereby the other hand is free to effect the removal of the cinder or other foreign object from the eye.

More specifically the invention comprehends a magnifying mirror for the purpose set forth, provided with a finger clamp element for supporting the same from one of the fingers while employing the thumb and another finger of the same hand to open the eye so as to permit of the free use of the other hand to effect removal of a foreign object from the eye.

The invention furthermore comprehends a device of the character set forth which is extremely simple in its construction and mode of use, which is highly efficient in its purpose and which is inexpensive to produce.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1:
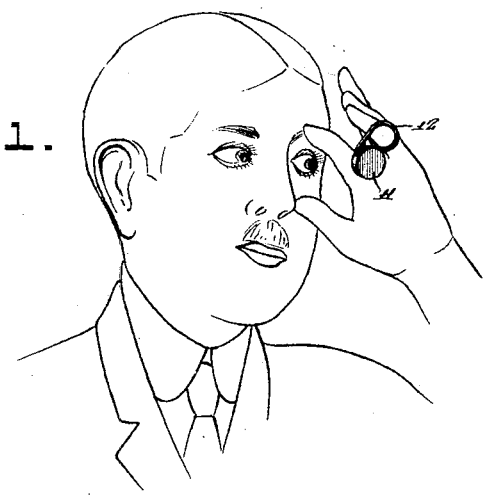
Figure 1 is a view illustrating the use of the device.
Figure 2:
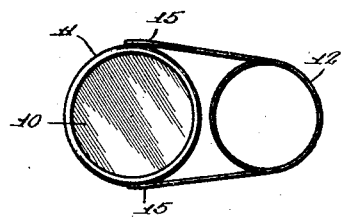
Fig. 2 is a face view of the device.
Figure 3:
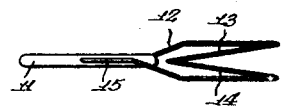
Fig. 3 is an edge view thereof.

Referring to the drawings by characters of reference, 10 designates a mirror preferably of a magnifying type, which is arranged in a frame 11 and which is provided with means 12 which permits of the positioning of the same relative to the eye by a portion of the hand while using the thumb and forefinger of the same hand to open the eye. The means 12, preferably as illustrated, consists of a length of resilient material or spring wire, which is coiled intermediate its length whereby convolutions 13 and 14 are provided which constitute spring clamping jaws adapted to engage preferably with the little finger. The free terminals 15 of the spring wire or resilient material are soldered or otherwise attached to the mirror frame 11.

In use, the mirror is supported from the finger of one hand as illustrated, which finger may be employed to properly position the mirror relative to the eye while the thumb and forefinger or index finger are used to open the eye as illustrated, leaving the other hand free to effect the removal of the foreign object or matter from the eye.

What is claimed is:

1. A device for facilitating the removal from the eye by the user, of a cinder or other foreign object, comprising a mirror, and means for supporting the same from a portion of one hand while using the thumb and forefinger of the same hand to open the eye whereby the other hand is free to effect the removal of the cinder or other foreign object from the eye, said supporting means consisting of a single length of resilient wire attached at its opposite ends to the mirror and coiled intermediate its length to provide a contractile helical portion adjacent convolutions of which define outwardly divergent clamping jaws between which a portion of the hand is received and by which it is frictionally gripped.

2. A device for facilitating the removal from the eye by the user, of a cinder or other foreign object, comprising a mirror, and means for supporting the same from a portion of one hand while using the thumb and forefinger of the same hand to open the eye whereby the other hand is free to effect the removal of the cinder or other foreign object from the eye, the means for supporting the mirror comprising a spring finger clamping element consisting of a length of resilient material coiled intermediate its ends to provide convolutions defining complementary clamping jaws.

3. A device of the character described and for the purpose specified, comprising a mirror, a frame therefor, and a supporting means consisting of a single length of resilient wire having its opposite ends attached to the frame and coiled intermediate its length to provide a contractile helical spring between two adjacent convolutions of which outwardly divergent clamping jaws are defined to facilitate the insertion and frictional engagement of a finger therewith.

ALBERT F. OUELLET.